(12) United States Patent
Elliott et al.

(10) Patent No.: US 11,196,119 B2
(45) Date of Patent: Dec. 7, 2021

(54) COLLAPSIBLE COVER FOR A BATTERY PACK

(71) Applicant: TECHTRONIC CORDLESS GP, Anderson, SC (US)

(72) Inventors: Halle Elliott, Greenville, SC (US); Brianna E. Williams, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 136 days.

(21) Appl. No.: 16/581,007

(22) Filed: Sep. 24, 2019

(65) Prior Publication Data

US 2020/0099021 A1 Mar. 26, 2020

Related U.S. Application Data

(60) Provisional application No. 62/736,785, filed on Sep. 26, 2018.

(51) Int. Cl.
*H01M 50/20* (2021.01)
*B25F 5/02* (2006.01)

(52) U.S. Cl.
CPC .............. *H01M 50/20* (2021.01); *B25F 5/02* (2013.01)

(58) Field of Classification Search
CPC ..... H01M 50/20; H01M 2220/03; B25F 5/02; Y02E 60/10
See application file for complete search history.

(56) References Cited

U.S. PATENT DOCUMENTS

| | | | |
|---|---|---|---|
| 4,224,385 A | 9/1980 | Ciliberti, Jr. et al. |
| 7,038,131 B1 | 5/2006 | Gretz |
| 7,381,894 B1 | 6/2008 | Shotey et al. |
| 7,396,996 B1 | 7/2008 | Shotey et al. |
| 7,541,540 B1 | 6/2009 | Shotey et al. |
| 7,554,037 B1 | 6/2009 | Shotey et al. |
| 7,598,454 B1 | 10/2009 | Baldwin et al. |
| 7,619,163 B1 | 11/2009 | Shotey et al. |

(Continued)

FOREIGN PATENT DOCUMENTS

| | | |
|---|---|---|
| CN | 103887456 A | 6/2011 |
| CN | 206163579 U | 5/2017 |

(Continued)

OTHER PUBLICATIONS

European Patent Office Extended Search Report for Application No. 19199902.8 dated Aug. 3, 2020 (8 pages).

(Continued)

*Primary Examiner* — Maria Laios
*Assistant Examiner* — Bartholomew A Hornsby
(74) *Attorney, Agent, or Firm* — Michael Best & Friedrich LLP

(57) ABSTRACT

A power tool includes a housing, a battery coupled to the housing, and a battery cover which covers at least a portion of the battery. The battery cover includes an expandable portion. The expandable portion is moveable from a collapsed position to an expanded position. When the expandable portion is in the collapsed position, the battery cover has a first internal area. When the expandable portion is in the expanded position the battery cover has a second internal area. The first internal area is less than the second internal area.

21 Claims, 5 Drawing Sheets

(56) References Cited

U.S. PATENT DOCUMENTS

| | | |
|---|---|---|
| 7,678,500 B2 | 3/2010 | Willey |
| 7,687,197 B2 | 3/2010 | Ladouceur et al. |
| 7,910,244 B2 | 3/2011 | Ladouceur et al. |
| 8,017,865 B1 | 9/2011 | Baldwin |
| 8,053,671 B1 | 11/2011 | Shotey et al. |
| 8,101,861 B1 | 1/2012 | Shotey et al. |
| 8,142,925 B2 | 3/2012 | Ladouceur et al. |
| 8,361,648 B2 | 1/2013 | Ladouceur et al. |
| 8,569,620 B1 | 10/2013 | Baldwin |
| 8,569,621 B1 | 10/2013 | Shotey et al. |
| 8,592,682 B1 | 11/2013 | Shotey et al. |
| 8,963,001 B2 | 2/2015 | Shotey et al. |
| 9,099,854 B2 | 8/2015 | Shotey et al. |
| 9,553,297 B2 | 1/2017 | Kolden et al. |
| 2005/0257944 A1* | 11/2005 | Cooper .................. B25F 5/006 173/217 |
| 2012/0048588 A1 | 3/2012 | Iyoda et al. |
| 2017/0331082 A1 | 11/2017 | Kawamata et al. |
| 2018/0034253 A1 | 2/2018 | Mortun |
| 2018/0108884 A1 | 4/2018 | Chen |

FOREIGN PATENT DOCUMENTS

| | | | |
|---|---|---|---|
| EP | 1772797 A1 | 4/2007 | |
| EP | 2424001 A2 * | 2/2012 | ................ B25F 5/00 |
| EP | 2424001 A2 | 2/2012 | |
| WO | 2018023008 A1 | 2/2012 | |
| WO | 2014167567 A1 | 10/2014 | |

OTHER PUBLICATIONS

Rei, "Sea to Summit X-Bowl", <https://www.rei.com/product/767560/sea-to-summit-x-bowl>, web page accessed Sep. 21, 2018.

* cited by examiner

COLLAPSIBLE COVER FOR A BATTERY PACK

CROSS REFERENCE TO RELATED APPLICATIONS

The present patent application claims priority to U.S. Provisional Patent Application No. 62/736,785 titled "COLLAPSIBLE COVER FOR A BATTERY PACK" and filed on Sep. 26, 2018, the entire contents of which is hereby incorporated by reference.

FIELD

The present subject matter relates to a collapsible cover, and more particularly a collapsible cover that is coupled to a tool.

BACKGROUND

Battery covers typically include rigid sidewalls and a pivot pin, which allow the battery cover to move between an open position and a closed position to shield a battery from debris or liquid.

SUMMARY

The present subject matter provides, in one aspect, a power tool. The power tool may include a housing, a battery which may be coupled to the housing, and a battery cover which may cover at least a portion of the battery. The battery cover may include an expandable portion. The expandable portion may be moveable from a collapsed position to an expanded position. When the expandable portion is in the collapsed position, the battery cover may have a first internal area. When the expandable portion is in the expanded position, the battery cover may have a second internal area. The first internal area may be less than the second internal area.

The present subject matter provides, in another aspect, a power tool. The power tool may include a housing, a battery which may be disposed in the housing, and a battery cover which may cover at least a portion of the battery. The battery cover may include a base, a plurality of panels, an angled member, and a back panel. The base may be pivotably coupled to the housing. One of the plurality of panels may be coupled to the base. The angled member may couple two of the plurality of panels. The back panel may be coupled to one of the plurality of panels via the angled member. The battery cover may be moveable between a first position and a second position.

Before any embodiments of the present subject matter are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
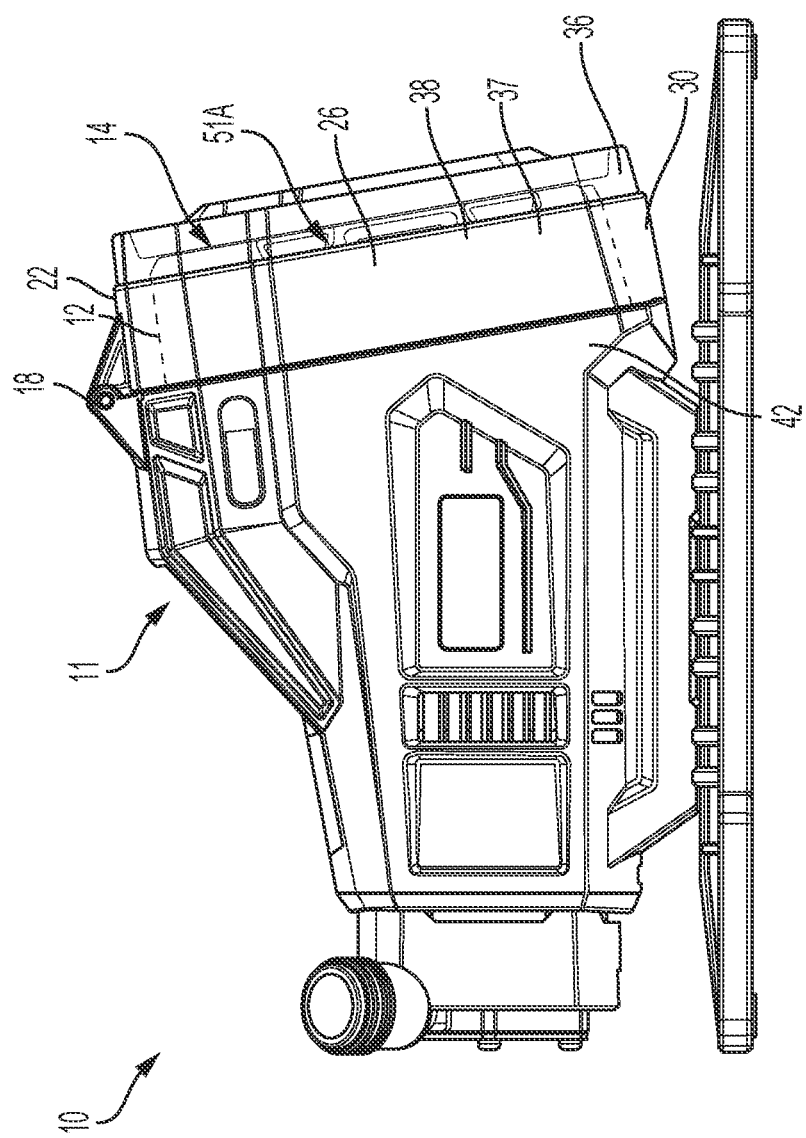
FIG. 1 is a side view of a battery cover with the battery cover in a collapsed position.

As shown in FIG. 1, a tool 10 may comprise and/or include a housing 11, a battery 12, shown schematically, and a battery cover 14 disposed over the battery 12. The battery 12 and/or the battery cover 14 may each be completely removable from the tool 10, or in some cases, the battery cover 14 may be attached to the tool 10, and may not be removable from the tool 10.

In some embodiments, the battery cover 14 may be pivotally coupled to the housing 11 via a pivot pin 18. The battery cover 14 may include multiple sides that form or define an inner cavity 36. For example, in the embodiment shown in FIG. 1, the battery cover 14 includes a base 37 with at least a first side 22, a second side 26, a third side 30, and a fourth side 34. The first side 22 may be pivotally coupled to the tool 10. The first side 22 and the third side 30 may be generally parallel to each other, and the second side 26 and the fourth side 34 may be generally parallel to each other, although sides having other positions, arrangements, and/or geometries are contemplated. The sides may form a substantially quadratic shape that defines the inner cavity 36. In some embodiments, the sides may form an alternative shape (e.g., a circular shape, an octagonal shape, or the like. In other embodiments, the sides may form an irregular or asymmetric shape. Outer surfaces 38 of the sides may be substantially flush with the outer surface 42 of the tool when the cover is in a closed position.

In some embodiments, the cover 14 may be moveable between the closed position and an open position. In some embodiments, the closed position may form a seal against the tool 10 (e.g., via compression of a portion of the battery cover 14, compression of a sealing member (e.g., a gasket, O-ring, and/or the like) disposed in the battery cover 14, and/or the like), thus, preventing environmental elements, such as water or debris, from coming into contact with the battery 12 and the open position may provide access to the battery 12 (e.g., for facilitating removal and/or insertion of the battery 12). Although the tool 10 in the depicted embodiment is a pump, in additional embodiments the battery cover 14 may be used with any other type of battery powered tool 10 (e.g., a drill, a saw, an impact wrench, an impact driver, a multi-tool, a nailer, and/or the like).

Figure 2:
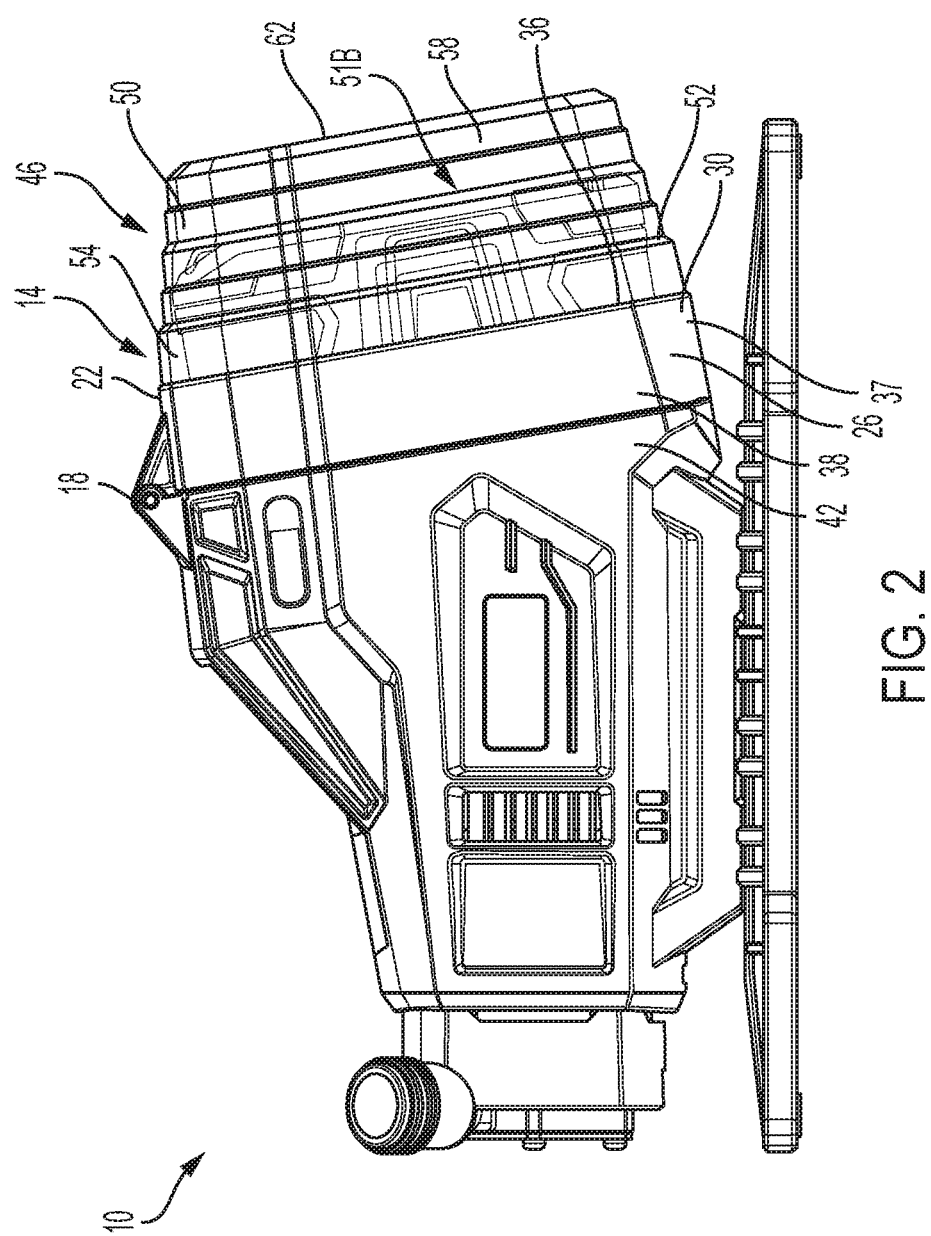
FIG. 2 is a side view of the battery cover of FIG. 1 with the battery cover in an expanded position.
Figure 3:
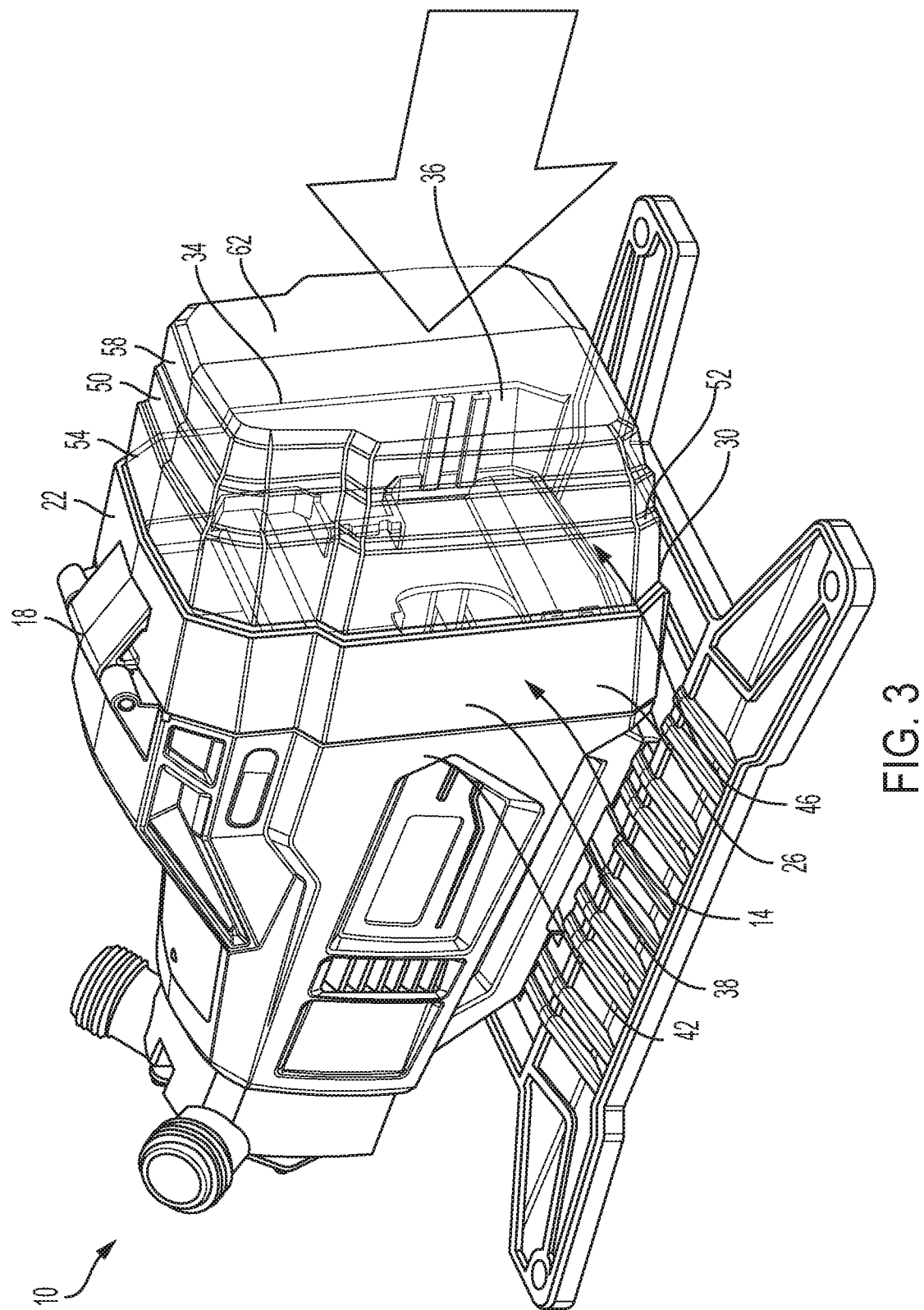
FIG. 3 is a perspective view of the battery cover of FIG. 1 with the battery cover in an expanded position.

As shown in FIGS. 2 and 3, the battery cover 14 may include an expandable portion 46. The expandable portion 46 may include one or more panels 50. The panels 50 may be engaged with an adjacent panel via a stepped or angled portion 52. A first panel 54 of the panels 50 may be coupled to an inner surface of the battery cover sides (22, 26, 30, and 34). The expandable portion 46 may further include a last panel 58 that functions in a similar manner to the additional panels. The last panel 58 may additionally include a back panel 62. The back panel 62 may enclose the expandable portion 46 and the battery cover 14 such that, when the battery cover 14 is in the closed position, the battery 12 may not be accessible. When a force is applied on the back panel 62 in a direction perpendicular to the back panel 62, the expandable portion 46 may move between a collapsed position and an expanded position. In the expanded position, the battery cover 14 may accommodate larger batteries than the battery cover 14 may accommodate in the collapsed position.

Each panel 50 may include a first side, a second side, a third side, and a fourth side, such that a perimeter of an outer surface of the sides of the panel may be smaller than the perimeter of the inner surface of the preceding panel. The inner cavity 36 may be created by the sides of the battery cover 14 and the expandable portion 46. When the panels 50 are in the expanded position, an area of the inner cavity 36 may be greater than an area of the inner cavity 36 when the panels 50 are in the collapsed position. In other words, the inner cavity 36 may define a first internal area 51A in the collapsed position (shown in FIG. 1) and a second internal area 51B in the expanded position (shown in FIG. 2), the first internal area may be less than the second internal area. When the panels 50 are in the collapsed position, the panels 50 may be nested within the first panel 54 of the battery cover 14 such that the sides of the panels 50 may not be visible. In the expanded position, the sides of the panels 50 may be visible and, thus, the area of the inner cavity 36 of the battery cover 14 may be greater than when the panels 50 were collapsed.

The panels 50 may include a height associated with each panel 50. The height may be measured as the distance between each panel 50 when the panels 50 are in the expanded position. The height may be constant between the first side, the second side, the third side, and the fourth side of the respective panel. The heights may correspond to the amount of additional area that may be provided when the expandable portion 46 is in the expanded position. In other words, an area of the panel 50 may be multiplied by the height of the panel 50 to determine the amount of additional area that panel 50 provides in the expanded position. In some embodiments, the height of each panel 50 may be substantially similar for all of the panels 50. In other embodiments, the height of each panel 50 may be different than the remainder of the panels 50.

Each panel 50 may be collapsible relative to the proceeding panel via the angled portions 52. The angled portions 52 may be constructed from a flexible material (e.g., rubber, plastic, fabric, waterproof fabric, hydrogels, and/or the like) such that the angled portions 52 may be moveable from an outward angle position to an inward angle position. The outward angle position may be defined as a position in which the angled portions 52 are at angles greater than ninety degrees relative to the respective panels 50. The inward angle position may be defined as a position in which the angled portions 52 are at angles less than ninety degrees relative to the respective panels 50. In other words, the angled portions 52 may form an obtuse angle in the outward angle position and the angled portions 52 may form an acute angle in the inward angle position. When the angled portions 52 are each in the inward angle position, the panels 50 may be nested within the first panel 54 in the collapsed position (FIG. 1). When the angled portions 52 are each in the outward angle position, the panels 50 may be in the expanded position (FIG. 2). The outward angle position and the inward angle position may be predetermined such that the angled portion 52 may rest in either the outward angle position or the inward angle position. The position the angled portion 52 rests in may be dependent on which position the angled portion 52 is in a closer proximity to.

To move the expandable portion 46 from the collapsed position to the expanded position, a force generally normal to that of the back panel 62 may be imparted on an inner surface of the back panel 62. As the force is imparted, each angled portion 52 may begin to move from the inward angle position. As the force is continued to be imparted on the inner surface of the back panel 62, the angled portion 52 may reach the outward angle position. At this time, the panels 50 may be in the expanded position. To move the expandable portion 46 from the expanded position to the collapsed position, a reciprocating force may be imparted on an outer surface of the back panel 62. This force may move the angled portion 52 from the outward angle position to the inward angle position, thus moving the panels 50 to the collapsed position.

The panels 50 may be formed, comprised, and/or composed of a silicone material, while the base 37 may be composed of a plastic material. The silicone material may be flexible to allow the panels 50 to move from the collapsed position to the expanded position to ensure adequate coverage of the battery 12. In some embodiments, the angled portions 52 may also be composed of the silicone material. In other embodiments, the angled portion 52 may be composed of a non-silicone material that is a different material than the panels 50. The plastic material of the base 37 may be sufficiently stiff, such that the battery sides may not significantly bend or deform.

Additionally, or alternatively, and in some cases, the expandable portion 46 may comprise a rigid cover that forms or defines an expanded space on or over a battery. Such a cover may comprise or be formed of a plastic material that can protect the battery from contaminants, moisture, and/or the like. In some embodiments, a seal or sealing member may be disposed between the expandable portion 46 and the tool so that a liquid tight seal forms around the battery.

Figure 5:
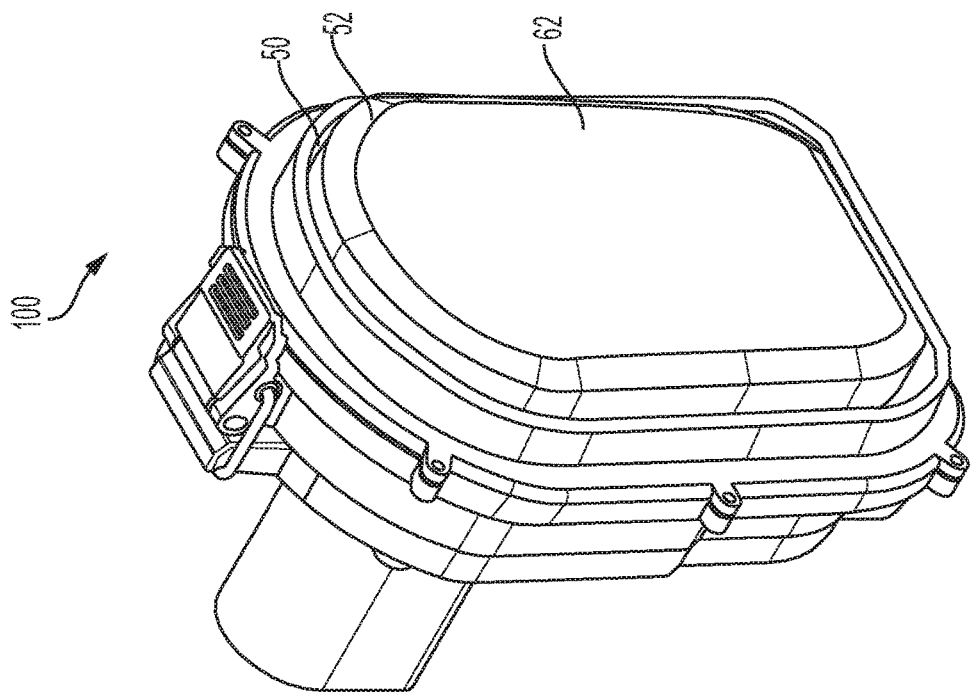
FIG. 5 is a perspective view of the battery cover of FIG. 4 with the battery cover in a collapsed position.
Figure 4:
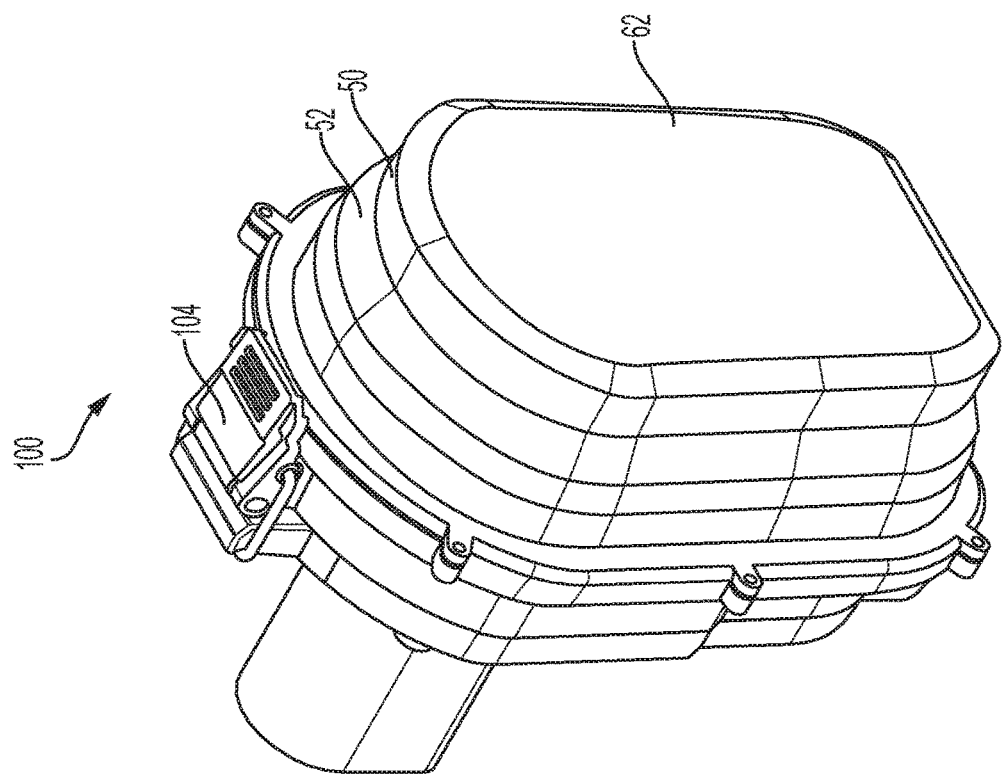
FIG. 4 is a perspective view of a battery cover according to another embodiment of the present subject matter with the battery cover in an expanded position.

FIGS. 4 and 5 disclose a battery cover 100 according to another embodiment of the present subject matter. The battery cover 100 may be similar to the battery cover 14. As such, only differences between the battery cover 100 and the battery cover 14 will be explained in detail. The battery cover 100 may include the panels 50, the angled portions 52, and the back panel 62, similar to the battery cover 14. The geometry of the battery cover 100 may be substantially similar to the battery cover 14. The battery cover 100 differs in that the battery cover 14 may be formed of a stretchable material different than the silicone material. For example, the panels 50, the angled portions 52, and the back panel 62 may be composed of a composite rubber material, a waterproof fabric, and/or the like. Additionally, the battery cover 100 may include a latch 104 that may be coupled to the base 37. The latch 104 may be moveable between a locked position and an unlocked position. In the locked position, the latch 104 may prevent the battery cover 100 from pivoting about the pivot pin 18. In the unlocked position, the latch 104 may allow the battery cover to pivot about the pivot pin 18. In some embodiments, the pivot pin 18 may not be included and, instead, an additional latch may be provided. In this embodiment, the latches may be positioned on opposite sides of the base 37 such that unlocking both latches allows the battery cover 100 to be removed. In other embodiments, latches may be positioned on every side of the base 37.

Figure 6:
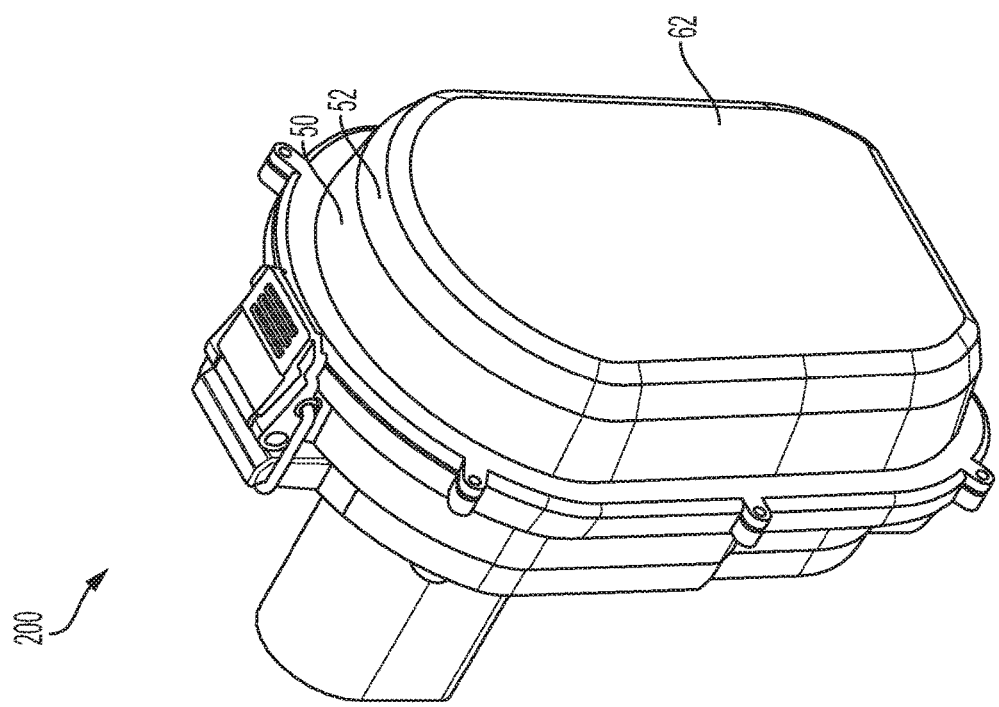
FIG. 6 is a perspective view of a battery cover according to another embodiment of the present subject matter.

FIG. 6 discloses a battery cover 200 according to another embodiment of the present subject matter. The battery cover 200 may be similar to the battery cover 100. As such, only differences between the battery cover 200 and the battery cover 100 will be explained in detail. The battery cover 200 may include the panel 50, the angled portion 52, and the back panel 62, similar to the battery cover 100. The battery cover 200 differs in that the battery cover 200 includes a singular panel 50 and a singular angled portion 52. In other words, when the battery cover 200 moves to the collapsed position, the singular angled portion 52 changes position.

In some embodiments, an accordion panel may be formed from the panel 50, the angled portions 52, and the back panel 62. When the accordion panel is in the expanded position, the accordion panel may be of a cuboid shape. When a force is applied on or over an outer surface of the accordion panel, the accordion panel may fold. When the accordion panel is folded, the accordion panel may be in the collapsed position. A force may be imparted on an inner surface of the accordion panel to move the accordion panel from the collapsed position to the expanded position.

In some embodiments, a continuous, flexible (e.g., rubber, etc.) panel may be formed from the panel 50, the angled portions 52, and the back panel 62. The continuous panel may be moveable between the expanded position and the collapsed position, whereby the continuous panel may be moved from the expanded position to the collapsed position via an application of force onto an outer surface of the continuous panel. When the continuous panel is compressed, the continuous panel may form the back surface of the expandable portion 46. To move the continuous panel from the compressed position to the expanded position, a reciprocating force may be imparted on an inner surface of the continuous panel, which may move the continuous panel to the expanded position.

In some embodiments, each panel 50 may be slidable relative to the preceding panel via tracks (not shown). The tracks may allow the following panel to slide into and out of the preceding panel such that the expandable portion 46 may move from the collapsed position to the expanded position. The battery cover sides (22, 26, 30, and 34) may also include tracks to allow the panels 50 to slide into the collapsed position. In other embodiments, the panels 50 may include other mechanisms for producing a sliding relationship between the panels 50.

A first locking feature (not shown) may prevent motion of the panels 50 when the expandable portion 46 is in the collapsed position and a second locking feature (not shown) may prevent motion of the panels 50 when the expandable portion 46 is in the expanded position. Example locking features may include a detent, a clip, a hook, and/or the like. In yet another embodiment, additional locking features may be used so the cover is held in a partially expanded position.

To move the expandable portion 46 from the collapsed position to the expanded position, a force perpendicular to that of the back panel 62 may be imparted on an inner surface of the back panel 62. As the force is imparted, the first locking feature may be disengaged and the expandable portion 46 expands. As the force is continued to be imparted on the inner surface of the back panel 62, the expandable portion 46 may reach the expanded position and the second locking feature may be engaged. A reciprocating force may be imparted on an outer surface of the back panel 62 to disengage the second locking feature and return the expandable portion 46 to the collapsed position.

In use, when a battery of a size that fits within the inner cavity 36 of the battery cover 14 is inserted into the tool 10, the expandable portion 46 may be moved to the collapsed position. When a battery sized greater than the inner cavity 36 when the cover is in the collapsed position, the battery cover 14 may be expanded, and the expandable portion 46 may be moved to the expanded position. In this position, the battery cover 14 may allow the battery to fit within the battery cover 14.

Although the present subject matter has been described in detail with reference to certain preferred embodiments, variations and modifications exist within the scope of one or more independent aspects of the present subject matter as described herein.

What is claimed is:

1. A power tool comprising:
a housing;
a battery coupled to the housing; and
a battery cover covering at least a portion of the battery, wherein the battery cover includes an expandable portion, and wherein the expandable portion is moveable from a collapsed position to an expanded position;
wherein, when the expandable portion is in the collapsed position, the battery cover has a first internal area, and when the expandable portion is in the expanded position, the battery cover has a second internal area; and
wherein the first internal area is less than the second internal area.

2. The power tool of claim 1, wherein the battery cover is pivotably coupled to the housing.

3. The power tool of claim 1, wherein the battery cover is removable from the housing.

4. The power tool of claim 2, wherein the battery cover is moveable between an open position in which the battery is accessible externally of the housing, and a closed position in which the battery is not accessible externally of the housing.

5. The power tool of claim 1, wherein the battery cover includes a panel, a back panel, and an angled portion.

6. The power tool of claim 5, wherein the angled portion is moveable between an outward angle position and an inward angle position.

7. The power tool of claim 6, wherein the angled portion is in the outward angle position when the battery cover is in the expanded position, and wherein the angled portion is in the inward angle position when the battery cover is in the collapsed position.

8. The power tool of claim 1, wherein the battery cover comprises silicone.

9. The power tool of claim 1, wherein the battery cover comprises rubber.

10. The power tool of claim 1, wherein the housing includes an inner cavity, and wherein the battery is seated in the inner cavity.

11. The power tool of claim 10, wherein the battery cover accommodates a larger battery in the expanded position than in the collapsed position.

12. A power tool comprising:
a housing;
a battery disposed in the housing; and
a battery cover covering at least a portion of the battery, the battery cover including:
a base pivotably coupled to the housing;
a plurality of panels, wherein one of the plurality of panels is coupled to the base;
an angled member coupling two of the plurality of panels;
a back panel coupled to one of the plurality of panels via the angled member,
wherein the battery cover is moveable between a first closed position and a second closed position.

13. The power tool of claim 12, wherein the housing includes an inner cavity, and wherein the battery is seated in the inner cavity.

14. The power tool of claim 13, wherein an area of the inner cavity when the battery cover is in the first position is larger than an area of the inner cavity when the battery cover is in a second position.

15. The power tool of claim 12, wherein the plurality of panels and the angled member comprise silicone.

16. The power tool of claim 12, wherein the base is moveable from an open position, in which the battery is accessible externally of the housing, and a closed position in which the battery is not accessible externally of the housing.

17. The power tool of claim 12, wherein in the first position the angled member is in an outward angle position, and in the second position the angled member is in an inward angle position, and wherein the outward angle position is different than the inward angle position.

18. The power tool of claim 12, wherein each of the plurality of panels is rectangular in shape.

19. The power tool of claim 12, wherein the angled member defines a first height between two of the plurality of panels when the battery cover is in the first position, and the angled member defines a second height between the two of the plurality of panels when the battery cover is in the second position, the second height being different than the first height.

20. The power tool of claim 12, wherein the back plate is farther from the housing when the battery cover is in the first position than when the battery cover is in the second position.

21. The power tool of claim 11, where the power tool is one of:
 a pump;
 a drill; or
 a driver.

* * * * *